United States Patent
Kucer

(10) Patent No.: US 9,765,561 B1
(45) Date of Patent: *Sep. 19, 2017

(54) DIGITAL MEDIA GATE

(71) Applicant: 9136665 Canada Inc, Montreal (CA)

(72) Inventor: Stephen Kucer, Montreal (CA)

(73) Assignee: IMPAX MEDIA HOLDINGS USA INC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/211,379

(22) Filed: Jul. 15, 2016

Related U.S. Application Data

(63) Continuation-in-part of application No. 14/809,248, filed on Jul. 26, 2015, now Pat. No. 9,449,450.

(60) Provisional application No. 62/079,247, filed on Nov. 13, 2014.

(51) Int. Cl.
| | |
|---|---|
| *G05B 19/00* | (2006.01) |
| *E05F 15/70* | (2015.01) |
| *E06B 11/02* | (2006.01) |
| *G06F 3/14* | (2006.01) |
| *G06K 9/78* | (2006.01) |
| *G06K 9/00* | (2006.01) |
| *G06Q 20/20* | (2012.01) |
| *G06Q 30/02* | (2012.01) |

(52) U.S. Cl.
CPC ............. *E05F 15/70* (2015.01); *E06B 11/02* (2013.01); *G06F 3/1431* (2013.01); *G06K 9/00778* (2013.01); *G06K 9/78* (2013.01); *G06Q 20/20* (2013.01); *G06Q 30/0269* (2013.01); *E05Y 2400/45* (2013.01); *E05Y 2900/13* (2013.01)

(58) Field of Classification Search
CPC ... A47F 9/00; A47F 9/04; A47F 9/048; G07C 9/00126; G07C 9/00158; G07C 9/00896; G06Q 20/20; G06Q 30/02; G06Q 30/0241; G06Q 30/0251; G06Q 30/0268; G06Q 30/0269; G06Q 30/0271; G06Q 30/0276; E05F 15/00; E05F 15/70; E05F 15/73–15/76; E06B 11/00–11/085
See application file for complete search history.

(56) References Cited

U.S. PATENT DOCUMENTS

| | | | | |
|---|---|---|---|---|
| 3,913,717 | A * | 10/1975 | Collins | G07F 17/145 194/211 |
| 5,189,404 | A * | 2/1993 | Masimo | G09G 1/00 345/634 |
| 5,747,784 | A * | 5/1998 | Walter | A47F 9/048 235/383 |
| 6,820,918 | B1 * | 11/2004 | DeBono | B60J 5/0472 16/289 |

(Continued)

OTHER PUBLICATIONS

International Search Report for Application No. PCT/US2016/13286, mailed on Aug. 29, 2016.

*Primary Examiner* — Ryan Sherwin
(74) *Attorney, Agent, or Firm* — FSP LLC

(57) ABSTRACT

An apparatus includes a housing, a digital display device, at least one gate coupled to the housing, and an analytical unit comprising a controller, the analytical unit coupled to the digital display device and the controller. The analytical unit includes logic to operate environmental sensors to identify demographic attributes of a proximate person to the digital display device and to locate digital content associated with the demographic attributes and to cause display of the digital content on the digital display device.

9 Claims, 12 Drawing Sheets

(56) References Cited

U.S. PATENT DOCUMENTS

| | | | | |
|---|---|---|---|---|
| 7,143,938 B2 * | 12/2006 | Hammerle | ............... | A47F 9/04 |
| | | | | 235/382 |
| 7,342,510 B2 * | 3/2008 | Pate | ...................... | G09F 19/22 |
| | | | | 116/63 P |
| 7,930,204 B1 * | 4/2011 | Sharma | ............. | G06Q 30/0203 |
| | | | | 705/7.32 |
| 8,006,435 B2 * | 8/2011 | DeBlonk | ............... | A63B 71/06 |
| | | | | 16/369 |
| 2006/0242908 A1 * | 11/2006 | McKinney | ............. | E05F 15/77 |
| | | | | 49/280 |
| 2013/0199094 A1 * | 8/2013 | Lachance | .............. | G08B 13/08 |
| | | | | 49/13 |
| 2014/0093125 A1 * | 4/2014 | Hradetzky | ......... | G06Q 30/0268 |
| | | | | 382/103 |
| 2014/0337149 A1 * | 11/2014 | Ke | ........................ | G06F 3/017 |
| | | | | 705/15 |

\* cited by examiner

DIGITAL MEDIA GATE

BACKGROUND

Check out lanes in retail establishments often have different physical widths. This is challenging to retail checkout control systems that must be configured to fit the different lane widths. Adapting control arms, gates, etc. in convenient and flexible manners that don't compromise security and other design constraints has proved challenging.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
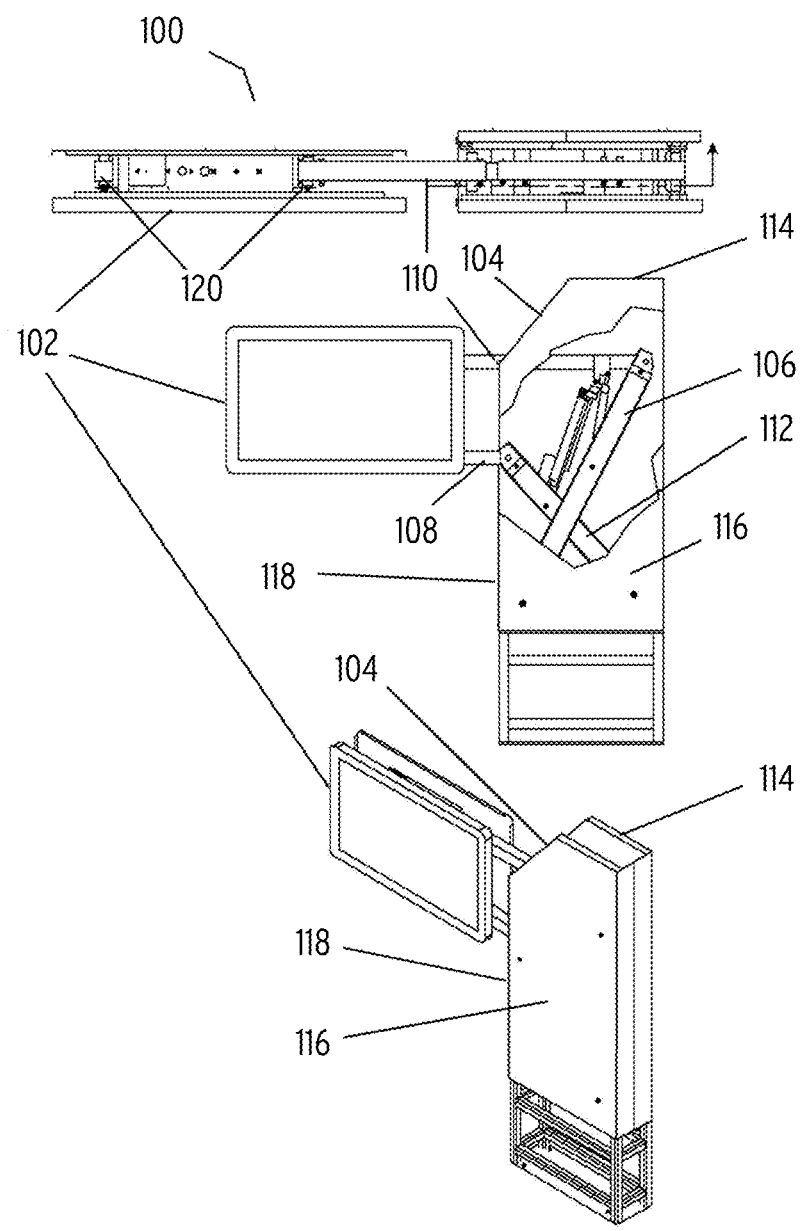
FIG. 1 illustrates an embodiment of a digital media gate 100.

Embodiments of a novel media gate are described that not only adapt to different lane widths, but also extend and retract in a manner that maintains a horizontal attitude of an attached media display throughout the extension/retraction process. This maximizes exposure of media to people at or near the gate.

In some embodiments, a gate extension and retraction apparatus may include a housing, a digital display device, at least one extension arm coupled to the housing and to the digital display device, an analytical unit, the analytical unit, and/or the analytical unit. The analytical unit may include a controller, the analytical until coupled to the digital display device and the controller coupled to the at least one extension arm.

In some embodiments, the apparatus may include logic to operate environmental sensors to identify demographic attributes of a proximate person to the digital display device and to locate digital content associated with the demographic attributes and to cause display of the digital content on the digital display device. The apparatus may include logic to operate the controller to operate the at least one extension arm to lift the digital display device from a first gate position blocking a retail lane to a second gate position permitting egress by the proximate person to the digital display device from the retail lane upon receiving a purchase confirmation from a point of sale device. The apparatus may include a camera that is one of the environmental sensors operated by the analytical unit, and/or a motion detector that is one of the environmental sensors operated by the analytical unit. The motion detector may be configured to signal to the analytical unit that the proximate person to the digital display device is passing underneath the digital display device and/or the analytical unit, and logic to generate an alarm in response thereto.

In some embodiments, the digital display device may include two opposing digital display surfaces. The apparatus may include a speaker operable by the analytical unit.

In some embodiments, may include an active actuator and a passive actuator are each pivotally coupled to the at least one extension arm. An electromagnetic toggle may be configured to secure the at least one extension arm to an active actuator while electrical power is available to the active actuator and/or the electromagnetic toggle configured to release the at least one extension arm from the active actuator when the electrical power is not available to the active actuator.

In some embodiments, such a extension and retraction apparatus may further include a near field wireless communicator. In some embodiments, such a extension and retraction apparatus may further include a fire panel interface.

The orientation of the display may remain constant either in landscape or portrait orientation. Whether the display orientation is portrait or landscape is configurable according to the lane width.

Generally, a plurality of mechanical supports and actuators are employed to support and move the gate. These arms are configured to move at different speeds and angles, maintaining a supported media gate in a horizontal attitude relative to the floor. In one embodiment, the mechanical supports and actuators comprise two telescoping tubes where the telescoping of each tube is driven by linear actuators that operate to telescope one tube at a different rate than the other.

The media gate may comprise a camera to capture video of people waiting behind (e.g., near) the gate. System logic may analyze video or images from the camera to ascertain attributes of the people for purposes of targeted advertising. Attributes may include the person's gender, approximate age, clothing, and whether they are accompanied by children or infants, for example.

The media gate may comprise a Wi-Fi access point which may communicate with mobile devices of people near the gate, for example to suggest promotions and coupon deals relevant to the detected attributes of those people.

Another implementation of a media gate includes a housing, a digital display device mounted atop the housing, an analytical unit including a controller, and at least one gate coupled to the housing (e.g., one gate, or two gates at opposing sides of the housing). The analytical unit is coupled to the digital display device and the controller is coupled to the at least one gate. The analytical unit includes logic to operate environmental sensors to identify demographic attributes of a proximate person to the digital display device and to locate digital content associated with the demographic attributes and to cause display of the digital content on the digital display device. The analytical unit also includes logic to operate the controller to transition the gate from a first gate state blocking a retail lane to a second gate state permitting egress by the proximate person to the digital display device from the retail lane upon receiving a purchase confirmation from a point of sale device. The media gate further includes a motion detector that is one of the environmental sensors operated by the analytical unit, the motion detector configured to signal to the analytical unit that the proximate person to the digital display device is passing underneath the gate, and the analytical unit includes logic to generate an alarm in response thereto. The digital display device may include two opposing digital display surfaces. Optionally the media gate may include a fire panel interface.

The camera may be one of the environmental sensors operated by the analytical unit (e.g., as part of the digital display device, the housing, or elsewhere). Likewise for a speaker and/or a near field wireless communicator operable by the analytical unit.

The housing may include an active actuator and a passive actuator each pivotally coupled to at least one extension arm controlling motion of the gate (e.g, in embodiments in which the one or more gates are extended and retracted from the housing). An electromagnetic toggle may secure the at least one extension arm to an active actuator while electrical power is available to the active actuator, and release the at least one extension arm from the active actuator when the electrical power is not available to the active actuator.

FIG. 1 illustrates an embodiment of a digital media gate 100. The digital media gate 100 comprises a display screen 102, tapered corner 104, upper support actuator 106, lower support 108, upper support 110, lower support actuator 112, top edge 114, housing 116, and inner edge 118. The digital media gate 100 may also include other features not necessary to this description.

The display screen 102 is retractable into and extendable from the housing 116. During extension and retraction, the display screen 102 remains horizontal to a floor below the display screen 102. An upper support actuator 106 controls an upper support 110 of the display screen 102, and a lower support actuator 112 controls a lower support 108 of the display screen 102. The lower support actuator 112 and the lower support 108 are configured such that the upper support actuator 106 extends away from an inner edge 118 of the housing 116 and the lower support actuator 112 extends toward the inner edge 118, forming a crossover configuration of the upper support actuator 106 and the lower support actuator 112.

The display screen 102 is adapted with pivots 120 that enable the lower support actuator 112 and the upper support actuator 106 to maintain the display screen 102 horizontal to the floor during extension from and retraction into the display screen 102. The upper support actuator 106 and the lower support actuator 112 are operated at different extension rates to maintain the horizontal aspect of the display screen 102.

The display screen 102 may be fixed in a landscape orientation (illustrated) or a portrait orientation, depending on the width of a retail lane that the display screen 102 blocks when extended. In one embodiment, a tapered corner 104 is formed between the inner edge 118 and the top edge 114. In the retracted position the display screen 102 fills the tapered corner 104 so that the right angle removed from the upper support actuator 106 by the tapered corner 104 is replaced by the upper right corner of the display screen 102.

In one embodiment the digital media gate 100 comprises logic to implement a learn and jog function. Upon installation of the digital media gate 100, the installer "jogs" both the rotational (angular) actuator (which orients the display screen 102) and the linear actuators (that raise or lower the display screen 102) to the "down" (blocking the retail lane) position. The installer then activates the learning function of the digital media gate 100. The installer then jogs both the rotational actuator and the linear actuators to the screen up (retracted from blocking the retail lane) position. The installer then ends learning mode. The digital media gate 100 may then autonomously transition between the up and down positions in normal operation.

Figure 2:
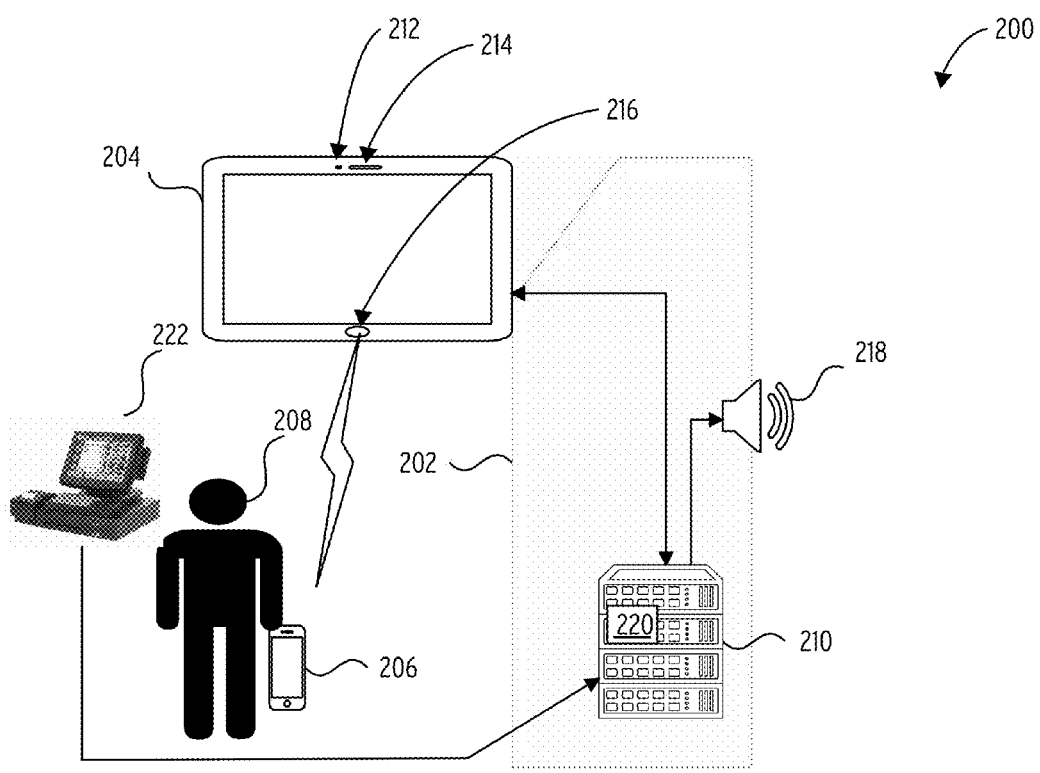
FIG. 2 illustrates an embodiment of a digital media gate 200 comprising an environmental response system.

FIG. 2 illustrates an embodiment of a digital media gate 200 comprising an environmental response system. The display screen 204 comprises a camera 212, microphone 214, and wireless communication logic 216. Each of these elements coupled to an analytic system 210, which may be housed in the housing 202 or external to the housing 202.

A mobile device 206 carried by a shopper 208 (not to scale) may communicate with the wireless communication logic 216 and in this manner receive and display to the shopper 208 coupons, promotions, advertisements, and other types of media from the analytic system 210. The analytic system 210 comprises a controller 220 for controlling extension and retraction of the display screen 204. The analytic system 210 may also communicate media to the speaker 218. A selection process by the analytic system 210 for the media may be influenced by environmental inputs from the camera 212 and microphone 214 (one or both). Some embodiments of the digital media gate 200 may utilize other sensors as well, such as near field scanners (e.g., RFID readers).

The media may be communicated to the shopper 208 in a number of ways, including but not limited to Wi-Fi, NFC (near field communication), QR codes, and beacon technology.

Although illustrated as elements of the display screen 204, in some embodiments of the digital media gate 200 any or all of the camera 212, microphone 214, and wireless communication logic 216 may be included on, within, or with the housing 202. The speaker 218 may in some embodiments be included in the display screen 204.

A signal from the point of sale device 222 indicating purchase confirmation by the shopper 208 may cause the analytic system 210 to operate the controller 220 to operate the media gate extension and retraction assembly 500 to lift the display screen 204 from blocking egress from the retail lane by the shopper 208. Logic of the analytic system 210 may cause the controller 220 to operate the media gate extension and retraction assembly 500 such that the display screen 204 is retracted (lifted) while maintaining a horizontal aspect, i.e., the display screen 204 stays horizontal with respect to a floor of the retail lane.

Figure 3:
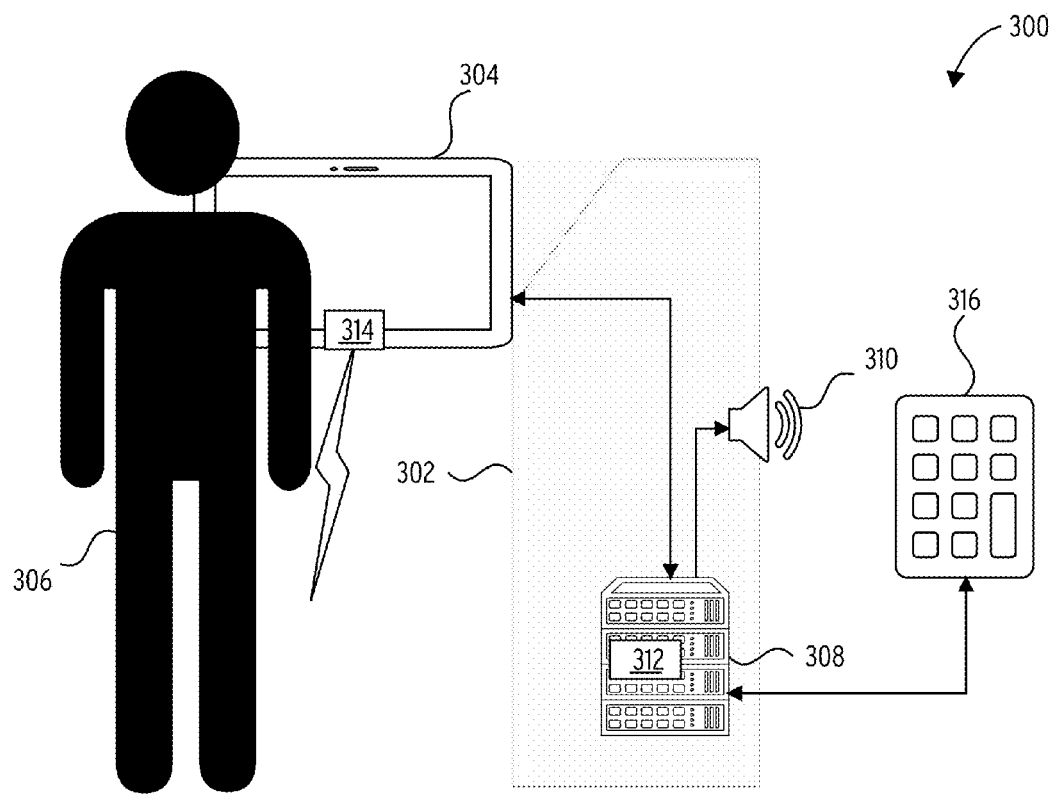
FIG. 3 illustrates an embodiment of a digital media gate 300 comprising an environmental response system.

FIG. 3 illustrates an embodiment of a digital media gate 300 comprising an environmental response system. The digital media gate 300 is configured for manual override in the event of a power failure. When the display screen 304 is in the down position (obstructing the retail lane) and there is a power failure, a shopper 306 or other party may pick up the screen with (for example) less than 25 LBS force. One or more passive gas actuator 502 will assist to position the display screen 304 in the up (retracted) position.

The analytic system 308 may interface to a fire panel. There is a choice of normally open or normally closed contacts between the analytic system 308 and the fire panel 316. The selection depends on the specific make and model of the fire panel 316. When the controller 312 receives a signal from the fire panel 316, the controller 312 automatically opens (lifts) the display screen 304. It will not respond to any user request unit the signal from the fire panel 316 is neutralized. An audible message may be played by the analytic system 308 through the speaker 310 enunciating for example "emergency exit here", repeatedly until the fire panel 316 signal is neutralized.

The display screen 304 may be double sided, i.e. one display area facing toward and away from shoppers in the retail lane.

When the display screen 304 is in the down (extended) position, a motion sensor 314 (e.g., an acoustic sensor) may monitor an area under the display screen 304. If the shopper 306 tries to pass under the display screen 304, the digital media gate 300 may generate an alarm, e.g., via the speaker 310 or via an electronic message to staff of the store.

When the display screen 304 is in the up (retracted) position, the motion sensor 314 monitors an area (e.g., 24") in front (toward the shopper 306) of the display screen 304 and an area (e.g., 24") behind the display screen 304. If the motion sensor 314 senses the presents of an object in either area, any extension of the display screen 304 that is under way is suspended or prevented until the area is cleared. An audible alert may sound via the speaker 310 as well.

Figure 4:
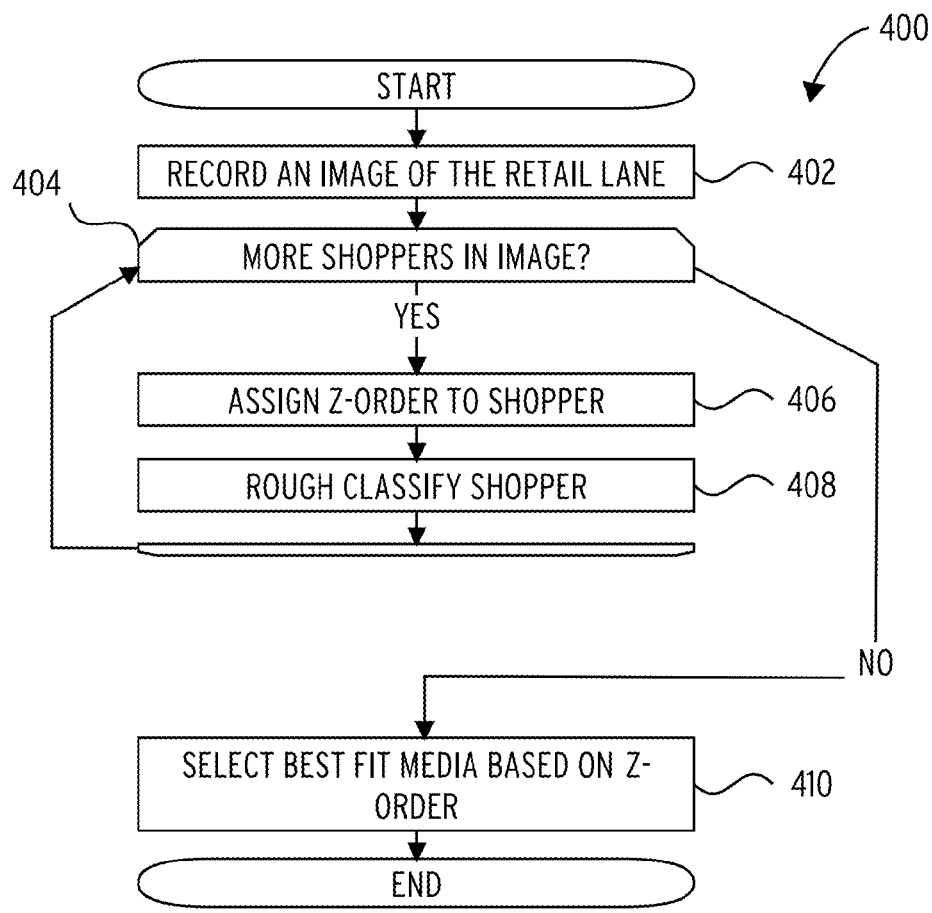
FIG. 4 illustrates an embodiment of a media selection process 400 carried out by the analytic system 206.

FIG. 4 illustrates an embodiment of a media selection process 400 carried out by an analytic system. An image or video of the retail lane controlled by the digital media gate is recorded (block 402). The analytic system analyzes the image for the presence of one or more shopper (opening loop block 404).

There are various ways that recording of the image may be triggered. Proximity sensors that detect motion, pressure, or presence are one example. Another way is continuously record and analyze video or photos.

A z-order is assigned to the detected shopper (block 406). The z-order identifies the shopper's order in line based on their depth in the recorded image. The analytic system also roughly classifies the shopper from their representation in the image (block 408). Example rough classifications are gender, age, and whether they are accompanied by children or infants.

When the analytic system can no longer identify additional shoppers, it selects best-fit media to communicate to the display screen and to the speaker.

In some embodiments, the video media that is selected for communication to the display screen is media deemed most relevant to the shopper having the lowest assigned z-order, based on that shopper's rough characteristics (block 410). In another embodiment, the shopper can speak to the microphone to identify products or services, and the analytic system will select media for the display screen accordingly. In some embodiments, the video media that is selected for communication to the display screen, and/or to the speaker, is media deemed most relevant to the a set of N shoppers having the lowest assigned z-orders, based on that shopper's rough characteristics. The video media selected by the analytic system for the display screen may be silent video associated with the characteristics of the lowest z-order shopper, while the audio media selected for the speaker may be associated with group characteristics of a set of N>1 shoppers having the lowest z-orders. In some cases the audio media may be generic, meaning not based on characteristics of the shoppers in the image, while the video media selected is associated with characteristics of the lowest value z-order shopper, or a set of N>1 lowest value z-order shoppers.

Figure 5:
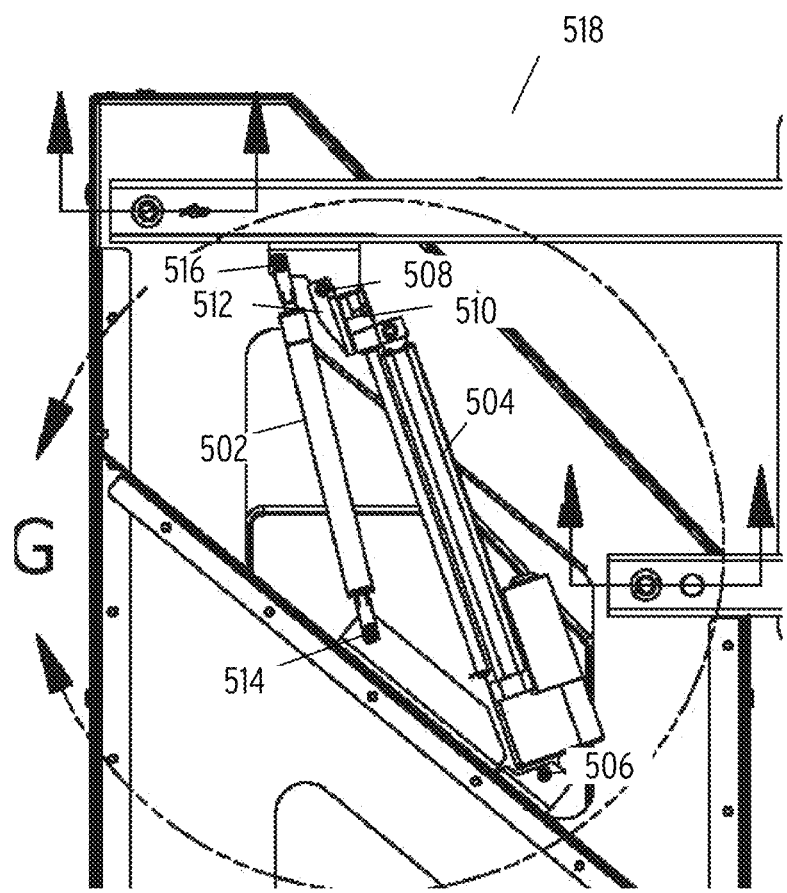
FIG. 5 illustrates an embodiment of a media gate extension and retraction assembly 500.

FIG. 5 illustrates an embodiment of a media gate extension and retraction assembly 500. The media gate extension and retraction assembly 500 comprises a passive gas actuator 502, a powered linear actuator 504, a linear actuator chassis pivot 506, a linear actuator arm pivot 508, an electromagnet 510, an electromagnet toggle 512, a gas actuator chassis pivot 514, and a gas actuator arm pivot 516.

The passive gas actuator 502 is a passive device, e.g., a gas spring, and the powered linear actuator 504 is an active device. The powered linear actuator 504 receives control signals from the controller 216 of the analytic system 206 and as well as provides feedback as to its position to the controller 216. Both the passive gas actuator 502 and the powered linear actuator 504 are fixed to the housing 222 and are permitted to pivot, as well as pivot with respect to the lower support 108 (deleted) and upper support 110 (deleted) as they both extend or retract. The passive gas actuator 502 pivots at the housing 222 at gas actuator chassis pivot 514, and at the support at gas actuator arm pivot 516. The powered linear actuator 504 pivots at the housing 222 at linear actuator chassis pivot 506 and at the support at linear actuator arm pivot 508.

The passive gas actuator 502 serves to offset the load of the display screen 220 that the powered linear actuator 504 is required to lift to extend the display screen 220. Similarly the passive gas actuator 502 offsets the force exerted by the display screen 220 on the powered linear actuator 504 as the display screen 220 is retracted.

Another mechanism involved in extending and retracting the display screen 220 is the electromagnet 510 and the electromagnet toggle 512. These serve as a failsafe mechanism in the event of a power failure. Specifically, if the display screen 220 is extended and there is a power failure the electromagnet 510 will release the electromagnet toggle 512. The electromagnet toggle 512 by distribution of its center of gravity rotates away from being engaged to the lifting mechanism (passive gas actuator 502 and powered linear actuator 504). This allows the display screen 220 to be lifted (retracted) manually, clearing the retail lane for emergency egress—with a lifting force of approximately (for some embodiments) 25 lbs. Once the power is restored, the controller 216 initiates a routine to identify the position of the display screen 220 and re-engage the electromagnet 510 and the electromagnet toggle 512.

Figure 6:
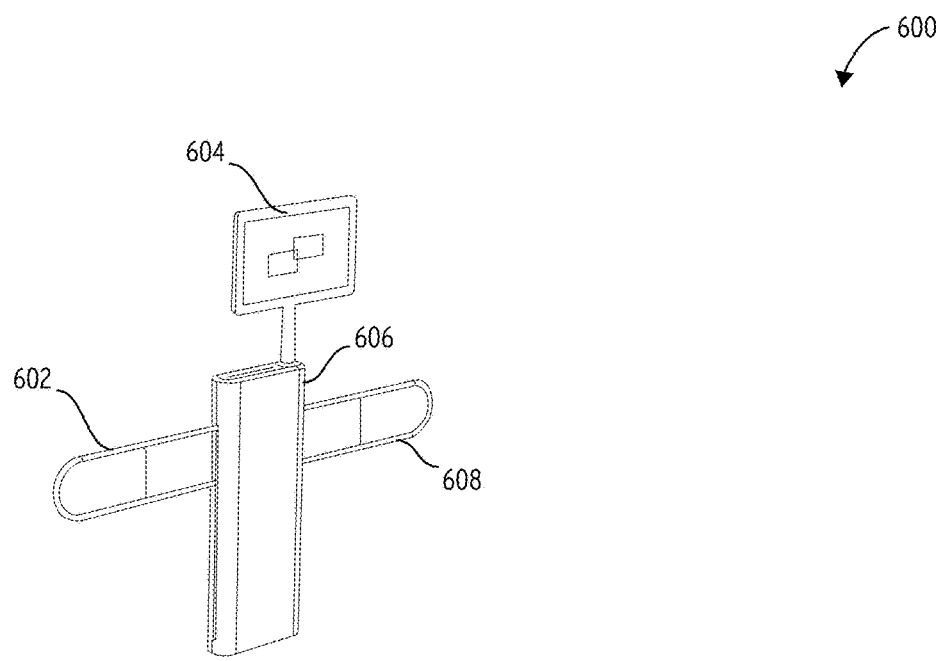
FIG. 6 illustrates a media gate 600 in accordance with one embodiment.
Figure 7:
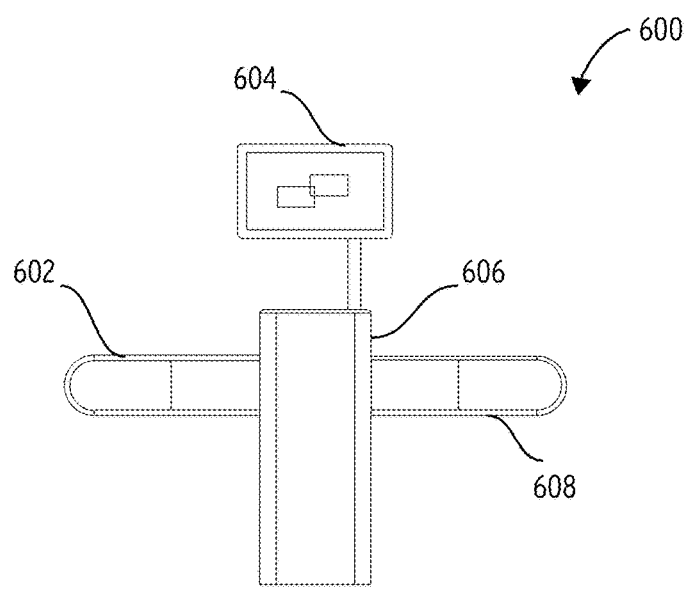
FIG. 7 illustrates a media gate 600 in accordance with one embodiment.
Figure 8:
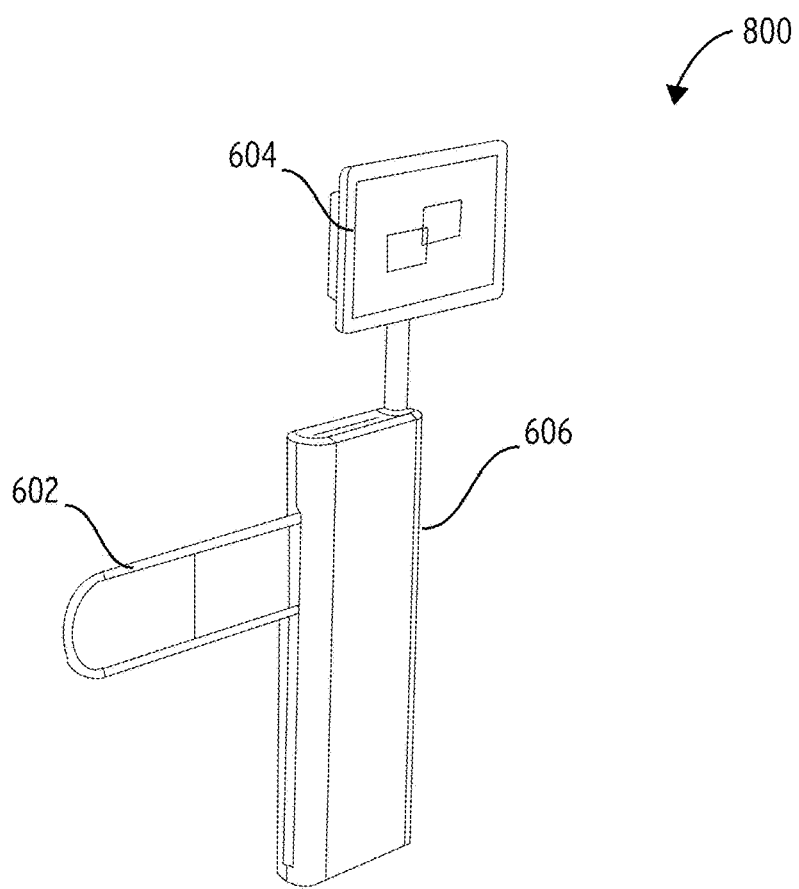
FIG. 8 illustrates a media gate 800 in accordance with one embodiment.
Figure 9:
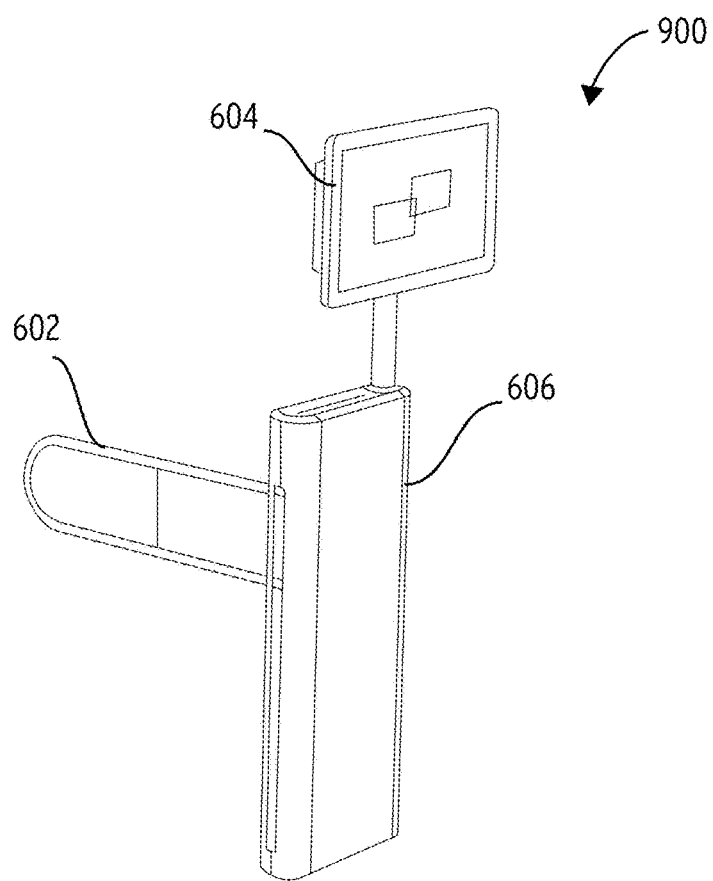
FIG. 9 illustrates a media gate 800 in accordance with one embodiment.

In various embodiments a media gate may include a media display 604 mounted atop a housing 606. The media gate 600 may utilize one gate (e.g., gate 602 as illustrated in FIG. 8 and FIG. 9) or two gates (e.g., gate 602 and gate 608 as illustrated in FIG. 6 and FIG. 7). The one or more gate may pivot horizontally to enable egress from a retail lane, as shown for example in FIG. 9.

Figure 10:
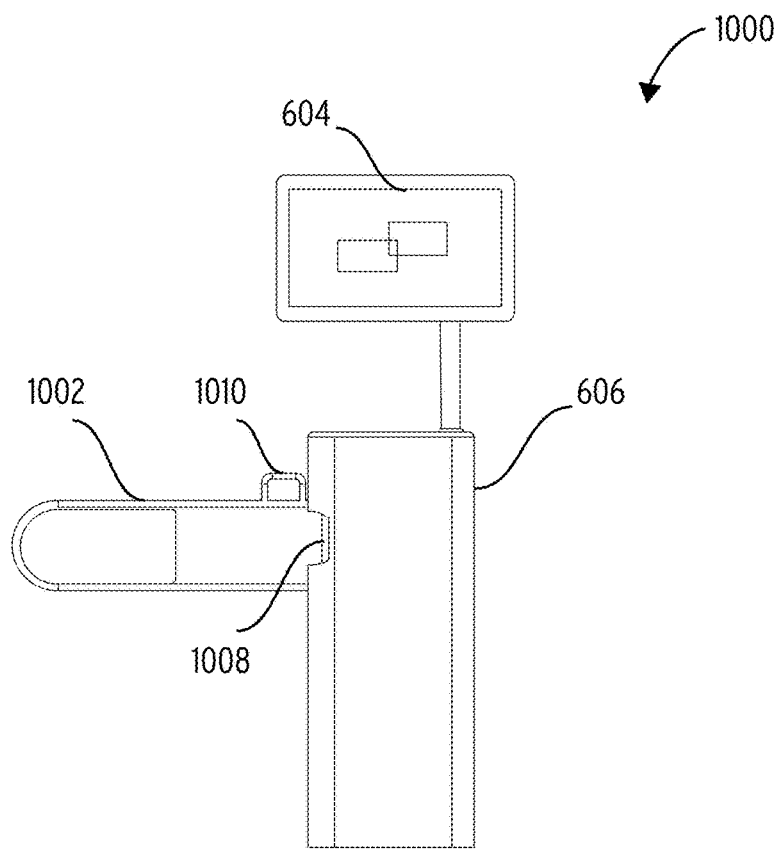
FIG. 10 illustrates a media gate 1000 in accordance with one embodiment.
Figure 11:
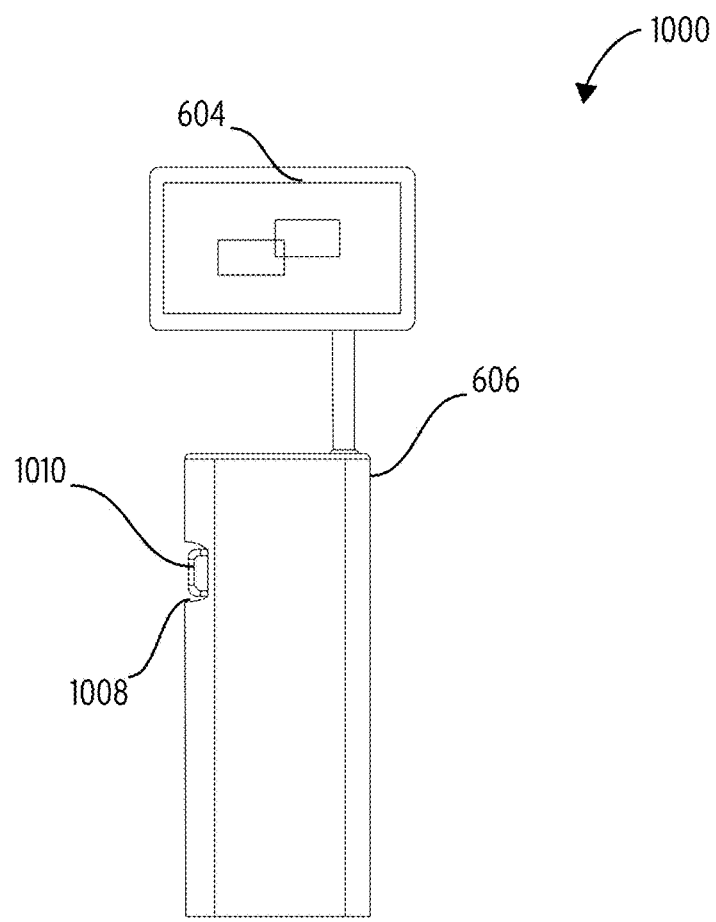
FIG. 11 illustrates a media gate 1000 in accordance with one embodiment.

FIG. 10 and FIG. 11 illustrate a media gate 1000 that include a gate 1002 that retracts vertically into the housing 606. The gate 1002 comprises a handle 1010 that aligns with a housing recess 1008 when the gate 1002 is retracted in the housing 606. The handle 1010 may be engaged to manually extract or retract the gate 1002 from or to the housing 606, although in typical operation the gate 1002 would be extended and retracted automatically by logic and mechanics of the media gate 1000 (for example, as previously described in conjunction with other embodiments of a media gate system).

Figure 12:
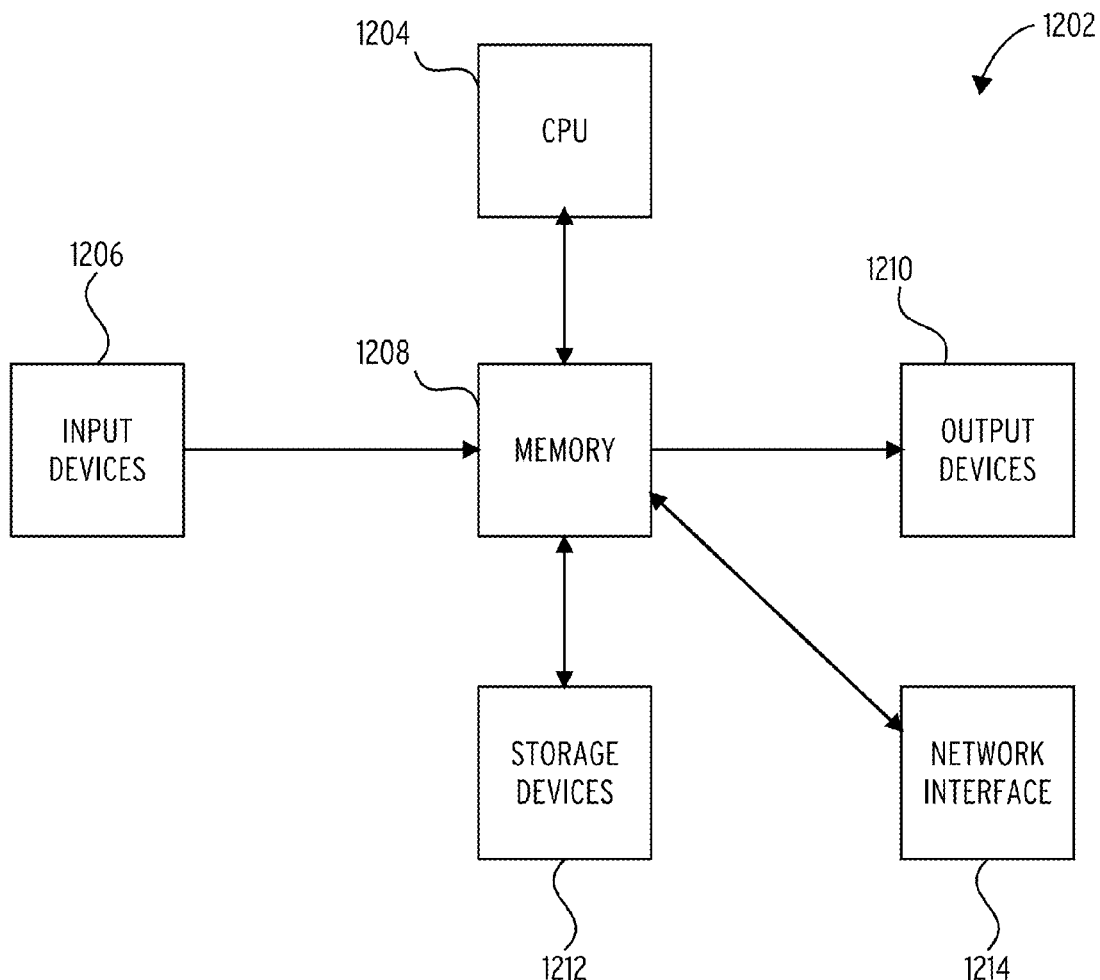
FIG. 12 illustrates an embodiment of analytic system 1200 for a digital media gate.

FIG. 12 illustrates an embodiment of an analytic system 1200 for a digital media gate. Input devices 1206 comprise transducers that convert physical phenomenon into machine internal signals, typically electrical, optical or magnetic signals. Signals may also be wireless in the form of electromagnetic radiation in the radio frequency (RF) range but also potentially in the infrared or optical range. Examples of input devices 1206 are keyboards which respond to touch or physical pressure from an object or proximity of an object to a surface, mice which respond to motion through space or across a plane, microphones which convert vibrations in the medium (typically air) into device signals, scanners which convert optical patterns on two or three dimensional objects into device signals. The signals from the input devices 1206 are provided via various machine signal conductors (e.g., busses or network interfaces) and circuits to memory 1208.

The memory 1208 is typically what is known as a first or second level memory device, providing for storage (via configuration of matter or states of matter) of signals received from the input devices 1206, instructions and information for controlling operation of the CPU 1204, and signals from storage devices 1212.

Information stored in the memory 1208 is typically directly accessible to the CPU 1204 of the device. Signals input to the device cause the reconfiguration of the internal material/energy state of the memory 1208, creating in essence a new machine configuration, influencing the behavior of the analytic system 1200 by affecting the behavior of the CPU 1204 with control signals (instructions) and data provided in conjunction with the control signals.

Second or third level storage devices 1212 may provide a slower but higher capacity machine memory capability. Examples of storage devices 1212 are hard disks, optical disks, large capacity flash memories or other non-volatile memory technologies, and magnetic memories.

The CPU 1204 may cause the configuration of the memory 1208 to be altered by signals in storage devices 1212. In other words, the CPU 1204 may cause data and instructions to be read from storage devices 1212 in the memory 1208 from which may then influence the operations of CPU 1204 as instructions and data signals, and from which it may also be provided to the output devices 1210. The CPU 1204 may alter the content of the memory 1208 by signaling to a machine interface of memory 1208 to alter the internal configuration, and then converted signals to the storage devices 1212 to alter its material internal configuration. In other words, data and instructions may be backed up from memory 1208, which is often volatile, to storage devices 1212, which are often non-volatile.

Output devices 1210 are transducers which convert signals received from the memory 1208 into physical phenomenon such as vibrations in the air, or patterns of light on a machine display, or vibrations (i.e., haptic devices) or patterns of ink or other materials (i.e., printers and 3-D printers).

The network interface 1214 receives signals from the memory 1208 and converts them into electrical, optical, or wireless signals to other machines, typically via a machine network. The network interface 1214 also receives signals from the machine network and converts them into electrical, optical, or wireless signals to the memory 1208.

References to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other.

"Logic" refers to machine memory circuits, non transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

Those skilled in the art will appreciate that logic may be distributed throughout one or more devices, and/or may be comprised of combinations memory, media, processing circuits and controllers, other circuits, and so on. Therefore, in the interest of clarity and correctness logic may not always be distinctly illustrated in drawings of devices and systems, although it is inherently present therein.

The techniques and procedures described herein may be implemented via logic distributed in one or more computing devices. The particular distribution and choice of logic will vary according to implementation.

Those having skill in the art will appreciate that there are various logic implementations by which processes and/or systems described herein can be effected (e.g., hardware, software, and/or firmware), and that the preferred vehicle will vary with the context in which the processes are deployed. "Software" refers to logic that may be readily readapted to different purposes (e.g. read/write volatile or nonvolatile memory or media). "Firmware" refers to logic embodied as read-only memories and/or media. Hardware refers to logic embodied as analog and/or digital circuits. If an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations may involve optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. Several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, flash drives, SD cards, solid state fixed or removable storage, and computer memory.

In a general sense, those skilled in the art will recognize that the various aspects described herein which can be implemented, individually and/or collectively, by a wide range of hardware, software, firmware, or any combination thereof can be viewed as being composed of various types of "circuitry." Consequently, as used herein "circuitry" includes, but is not limited to, electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), circuitry forming a memory device (e.g., forms of random access memory), and/or circuitry forming a communications device (e.g., a modem, communications switch, or optical-electrical equipment).

Those skilled in the art will recognize that it is common within the art to describe devices and/or processes in the fashion set forth herein, and thereafter use standard engineering practices to integrate such described devices and/or processes into larger systems. That is, at least a portion of the devices and/or processes described herein can be integrated into a network processing system via a reasonable amount of experimentation.

The invention claimed is:

1. An apparatus comprising:
   a housing;
   a digital display device mounted atop the housing;
   an analytical unit comprising a controller; and
   at least one gate coupled to the housing;
   the analytical unit coupled to the digital display device and the controller coupled to the at least one gate;
   the analytical unit comprising logic to operate environmental sensors to identify demographic attributes of a proximate person to the digital display device and to locate digital content associated with the demographic attributes and to cause display of the digital content on the digital display device;
   the analytical unit comprising logic to operate the controller to transition the at least one gate from a first gate state blocking a retail lane to a second gate state permitting egress by the proximate person to the digital display device from the retail lane upon receiving a purchase confirmation from a point of sale device;
   a motion detector that is one of the environmental sensors operated by the analytical unit;
   the motion detector configured to signal to the analytical unit that the proximate person to the digital display device is passing underneath the at least one gate; and
   the analytical unit comprising logic to generate an alarm in response to the signal from the motion detector.

2. The apparatus of claim 1, wherein the at least one gate comprises two gates.

3. The apparatus of claim 1, further comprising:
   a camera that is one of the environmental sensors operated by the analytical unit.

4. The apparatus of claim 1, wherein the digital display device comprises two opposing digital display surfaces.

5. The apparatus of claim 1, further comprising:
   a speaker operable by the analytical unit.

6. The apparatus of claim 1, further comprising:
   the housing comprising an active actuator and a passive actuator each pivotally coupled to at least one extension arm controlling motion of the at least one gate.

7. The apparatus of claim 6, further comprising:
   an electromagnetic toggle configured to secure the at least one extension arm to an active actuator while electrical power is available to the active actuator; and
   the electromagnetic toggle configured to release the at least one extension arm from the active actuator when the electrical power is not available to the active actuator.

8. The apparatus of claim 1, further comprising:
   a near field wireless communicator.

9. The apparatus of claim 1, further comprising:
   a fire panel interface.

* * * * *